J. H. McKNIGHT.
Gate.

No. 81,662.

Patented Sept. 1, 1868.

Witnesses:
Wm. A. Morgan
G. C. Cotton

Inventor:
J. H. McKnight
per Munn & Co
Attorney

United States Patent Office.

J. H. McKNIGHT, OF OAKWOOD, MICHIGAN.

Letters Patent No. 81,662, dated September 1, 1868.

IMPROVEMENT IN GATES.

The Schedule referred to in these Letters Patent and making part of the same.

TO ALL WHOM IT MAY CONCERN:

Be it known that I, J. H. McKnight, of Oakwood, in the county of Oakland, and State of Michigan, have invented a new and useful Improvement in Gates; and I do hereby declare that the following is a full, clear, and exact description thereof, which will enable others skilled in the art to make and use the same, reference being had to the accompanying drawings, forming a part of this specification.

Similar letters of reference indicate corresponding parts.

My invention has for its object to furnish an improved gate, simple in construction, strong, and durable, and which may be conveniently operated to open or close it without its being necessary to get out of the carriage for that purpose.

And it consists in the construction and combination of the various parts of the gate, as hereinafter more fully described.

A is the front gate-post, which is slotted vertically or made in two parts, the inner sides of the upper ends of said parts being bevelled off or inclined so as to insure the gate passing down into proper position as it descends.

B is the rear gate-post, which is also slotted or made in two parts, to and between which the rear end of the gate is pivoted.

C is the gate, which has five horizontal bars, $c^1$, to the central one of which the others are connected. The central horizontal bar is made larger and stronger than the others; is pivoted to and between the parts of the rear post B, and to its projecting rear end is attached the weight-box D, in which is placed a sufficient weight to balance the gate C, when raised to about an angle of forty-five degrees (45°.)

Figure 1:
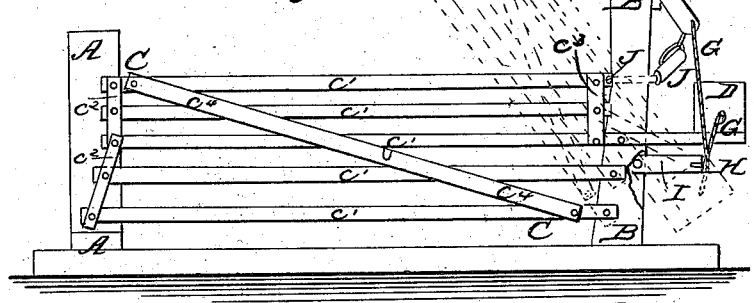
Figure 1 is a side view of my improved gate, parts being broken away to show the construction, and showing in red lines the position of the parts when the gate is partially opened.

The forward ends of the longitudinal bars $c^1$ are connected to each other by the two short bars $c^2$, the adjacent ends of which are pivoted to each other and to the end of the central horizontal bar, and to which the ends of the other horizontal bars are pivoted, as shown in fig. 1.

The rear ends of the upper horizontal bars $c^1$ are pivoted to the short connecting-bar $c^3$, the lower end of which is pivoted to the central horizontal bar.

The rear ends of the lower horizontal bars are pivoted directly to the rear post B.

$c^4$ is a diagonal connecting-bar, the lower end of which is pivoted to the rear part of the bottom horizontal bar, and the upper end of which is pivoted to the forward part of the top horizontal bar, as shown in fig. 1.

The effect of the diagonal bar $c^4$ is, when the gate is raised, to cause the horizontal bars $c^1$ to fold in towards the central horizontal bar, as shown in fig. 1, so that the said bars may be close to each other when raised into a vertical position.

Figure 2:
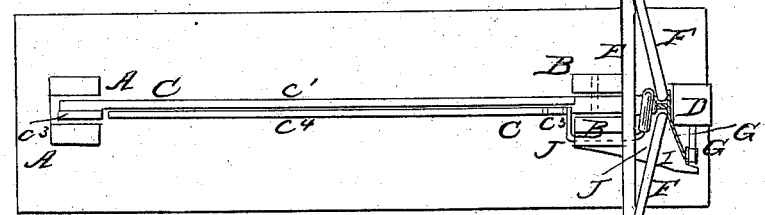
Figure 2 is a top or plan view of the same.

To the upper end of the rear gate-post B is attached a cross-bar, E, to the ends of which are pivoted the levers F, as shown in figs. 1 and 2.

G is a rope or chain, the upper end of which is connected to the ends of the two levers F, from which it passes around the pulley H, pivoted to the outer end of the arm I, attached to the post B.

The other end of the rope or chain G is attached to the weight-box D, as shown in fig. 1. By this arrangement, when the gate is either opened or closed, it may be moved to the opposite position by giving a short, quick downward movement to the outer end of either of the two levers F, so as to give to the weighted end of the gate a downward or upward impulse, which will carry the gate past its balancing-point, allowing it to be carried the rest of the way by the action of gravity.

J is the catch, which is pivoted to the side of the rear gate-post B, and the forward end of which is bent inward, so that its inward end may catch upon the rear side of the connecting-bar $c^3$.

By allowing the catch J to catch upon the forward side of the upper end of the connecting-bar $c^3$, the gate C may be held partially suspended, to allow small stock to pass back and forth beneath it.

The rear end of the catch J is bent inward into a position parallel with or nearly parallel with its inwardly-projecting forward end, as shown in figs. 1 and 2. The rear end of the catch J is weighted, and is connected with the inner ends of the levers F, so that as the said levers F are operated to open the gate C, the first effect may be to raise the catch J from the bar $c^3$, allowing the said gate C to be opened.

As the levers F are released, the weighted end of the catch J brings it back into proper position to again catch upon the bar $c^3$ when the gate C is lowered, and fasten said gate shut.

Having thus described my invention, what I claim as new, and desire to secure by Letters Patent, is—

1. The gate C, formed by the combination of the horizontal bars $c^1$, pivoted connecting-bars $c^2$ and $c^3$, pivoted diagonal bar $c^4$, and weight-box D, with each other and with the gate-post B, said gate C being constructed and operating substantially as herein shown and described.

2. The combination of the levers F and cord or chain G with the weighted pivoted gate C, substantially as herein shown and described, and for the purpose set forth.

3. The weighted catch J, in combination with the gate C, post B, and levers F, substantially as herein shown and described, and for the purpose set forth.

The above specification of my invention signed by me, this 27th day of June, 1868.

J. H. McKNIGHT.

Witnesses:
    J. N. LOMIS,
    H. C. LOMIS.